(12) United States Patent
Alberth, Jr. et al.

(10) Patent No.: US 7,464,863 B2
(45) Date of Patent: Dec. 16, 2008

(54) METHOD AND APPARATUS FOR MANAGING INFORMATION

(75) Inventors: William P. Alberth, Jr., Prairie Grove, IL (US); Patricia A. Robb, Prairie Grove, IL (US)

(73) Assignee: Motorola, Inc., Libertyville, IL (US)

( * ) Notice: Subject to any disclaimer, the term of this patent is extended or adjusted under 35 U.S.C. 154(b) by 207 days.

(21) Appl. No.: 11/240,356

(22) Filed: Oct. 3, 2005

(65) Prior Publication Data

US 2007/0075131 A1 Apr. 5, 2007

(51) Int. Cl.
G06K 5/00 (2006.01)
(52) U.S. Cl. .......................... 235/380; 235/487; 705/41
(58) Field of Classification Search .................. 235/380, 235/375, 451, 487, 492; 705/14, 26, 41
See application file for complete search history.

(56) References Cited

U.S. PATENT DOCUMENTS

| | | | |
|---|---|---|---|
| 5,710,886 A | 1/1998 | Christensen et al. | |
| 6,035,280 A | 3/2000 | Christensen | |
| 6,601,761 B1* | 8/2003 | Katis ........................... | 235/379 |
| 2001/0011250 A1* | 8/2001 | Paltenghe et al. ............. | 705/41 |
| 2002/0060246 A1* | 5/2002 | Gobburu et al. ........ | 235/462.46 |
| 2002/0065713 A1 | 5/2002 | Awada et al. | |
| 2002/0091569 A1 | 7/2002 | Kitaura et al. | |
| 2002/0107797 A1* | 8/2002 | Combaluzier ................. | 705/41 |
| 2002/0123965 A1* | 9/2002 | Phillips ........................ | 705/41 |
| 2002/0138345 A1 | 9/2002 | Dickson et al. | |
| 2002/0198777 A1 | 12/2002 | Yuasa | |
| 2003/0009382 A1* | 1/2003 | D'Arbeloff et al. ........... | 705/17 |
| 2003/0088461 A1 | 5/2003 | Christensen | |
| 2003/0150142 A1* | 8/2003 | Street ....................... | 40/124.11 |
| 2004/0019564 A1* | 1/2004 | Goldthwaite et al. .......... | 705/44 |
| 2004/0111360 A1* | 6/2004 | Albanese ...................... | 705/38 |
| 2004/0210498 A1* | 10/2004 | Freund .......................... | 705/30 |
| 2004/0249710 A1* | 12/2004 | Smith et al. ................... | 705/14 |
| 2005/0187873 A1* | 8/2005 | Labrou et al. ................. | 705/40 |
| 2005/0269401 A1* | 12/2005 | Spitzer et al. ................ | 235/380 |
| 2006/0065748 A1* | 3/2006 | Halbur et al. ................ | 235/493 |
| 2007/0066341 A1* | 3/2007 | Silverbrook et al. ...... | 455/550.1 |

FOREIGN PATENT DOCUMENTS

| | | |
|---|---|---|
| WO | WO2004/008276 | 1/2004 |
| WO | WO 2004/008276 | 1/2004 |
| WO | WO 2004/027662 | 4/2004 |
| WO | WO2004/402766 | 4/2004 |

* cited by examiner

*Primary Examiner*—Edwyn Labaze
(74) *Attorney, Agent, or Firm*—Gary J. Cunnigham

(57) ABSTRACT

In a method of managing information, information is stored associated with at least one wallet card in an electronic device. An establishment is entered with the electronic device. The location of the establishment is determined. A determination of whether at least one wallet card is associated with the location. Information from the at least one wallet card is outputted in response to the determination of the location is associated with the at least one wallet card.

21 Claims, 7 Drawing Sheets

METHOD AND APPARATUS FOR MANAGING INFORMATION

FIELD

This invention relates generally to managing cards in a wallet. More particularly, embodiments relate to electronic management of wallet cards that a user may carry in her wallet with a mobile device.

DESCRIPTION OF THE RELATED ART

A typical consumer carries many cards in her wallet, i.e., wallet cards. For example, the consumer may carry a grocery card in order to capitalize on the savings associated with the grocery card. More particularly, the grocery associated with the grocery card may allow the consumer to take a sale price for an item as long as the grocery card is scanned prior to checkout. Consumers typically have more than one grocery card.

Along with grocery cards, the consumer may also carry rewards cards. A retail establishment may issue a reward card that provides incentives for continued patronage of the establishment. For example, Blockbuster™ may issue a reward card where the consumer may get a free video rental after five paid rentals. Again, the consumer may have multiple reward cards (dry cleaner, retail food establishments and the like).

As a result, the typical consumer has a wallet that would be rather large and unwieldy if the consumer were to carry every wallet card. Some consumers do carry all their wallet cards but this leads to delays at checkout waiting for the consumer to search for the appropriate wallet card.

The consumer may pare down the wallet cards so as to minimize the thickness and weight of the wallet. However, the consumer may omit a necessary wallet card in the event he walks into an establishment that he is a member thereof. Thus, the consumer may lose incentives and/or discounts from the establishment.

This omission of the wallet card also applies to gift cards. As another wallet card, the gift card may be carried in the wallet. However, most consumers leave the gift card out of their wallets because of the added size, weight and the additional inconvenience of carrying an additional wallet card.

Another problem with gift cards for consumers is that the consumer may forget that she is carrying the gift card. The consumer typically carries many wallet cards and if a large enough lapse in time as occurred, the consumer may forget that the gift card is in her wallet. As the consumer keeps forgetting, the balance on the gift card begins to decrease for some gift cards. A related problem with gift cards is that the consumer may forget the balance on the gift card. More specifically, there may be a long period of time between purchases using the gift card.

SUMMARY

An embodiment generally relates to a method of managing information. The method includes storing information associated with at least one wallet card in an electronic device and entering a location with the electronic device. The method also includes determining whether at least one wallet card is associated with the location and outputting information from the at least one wallet card in response to the determination of the location is associated with the at least one wallet card.

Another embodiment generally pertains to a method of managing information. The method includes storing information associated with at least one wallet card in a wireless device and receiving at least one message with an establishment. The method also includes determining whether at least one wallet card is associated with the establishment and outputting information from the at least one wallet card in response to the determination that the establishment is associated with the at least one wallet card.

Yet another embodiment generally relates to an apparatus for managing information. The apparatus includes a wireless communication device that includes a controller, a location determination module, a memory and a scanner module. The controller is configured to interface with the location determination module, the memory and the scanner module. The controller is configured to store information related to a wallet card being scanned by the scanner module in the memory, determine a location with the location determination module in response to a user entering an establishment, and output information related to a wallet card in response to the determination of the location is associated with the wallet card.

Accordingly, embodiments generally assist users in managing their wallet cards by maintaining the related information in the wireless communication device which automatically notifies them of the relevant wallet card when entering an establishment. Thus, the user does not have to carry his wallet cards and leaves his wallet a manageable size and weight. Moreover, the user can ensure that the gift cards are being used within a timely manner because the wireless communication device is configured to display the relevant gift card when the user enters the appropriate establishment.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of wireless communication systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to a method and apparatus for managing wallet cards with a wireless communication device such as a cellular telephone, personal digital assistant, laptop, and the like. More specifically, a wireless communication device may be configured to receive the scanned image of a wallet card from a user. A wallet card may be a membership card, a rewards card, a gift card or other similar card. The wireless communication device stores information from the wallet card such as address of an establishment, membership information, customer number, account balance, etc. When a user enters an establishment, the wireless communication device may be configured to alert the user that a stored wallet card is may be used in the establishment. In some embodiments, if the card is a reward card, the wireless communication device may display the status of the reward card, e.g., how many more points to the next reward. In other embodiments, the wireless communication device may display a gift card for the location. In yet other embodiments, the wireless communication device may be used in transactions at a location. More specifically, the wireless communication device may display the membership number, a customer number or transmit the appropriate code for a gift card to the cash register.

Figure 1:
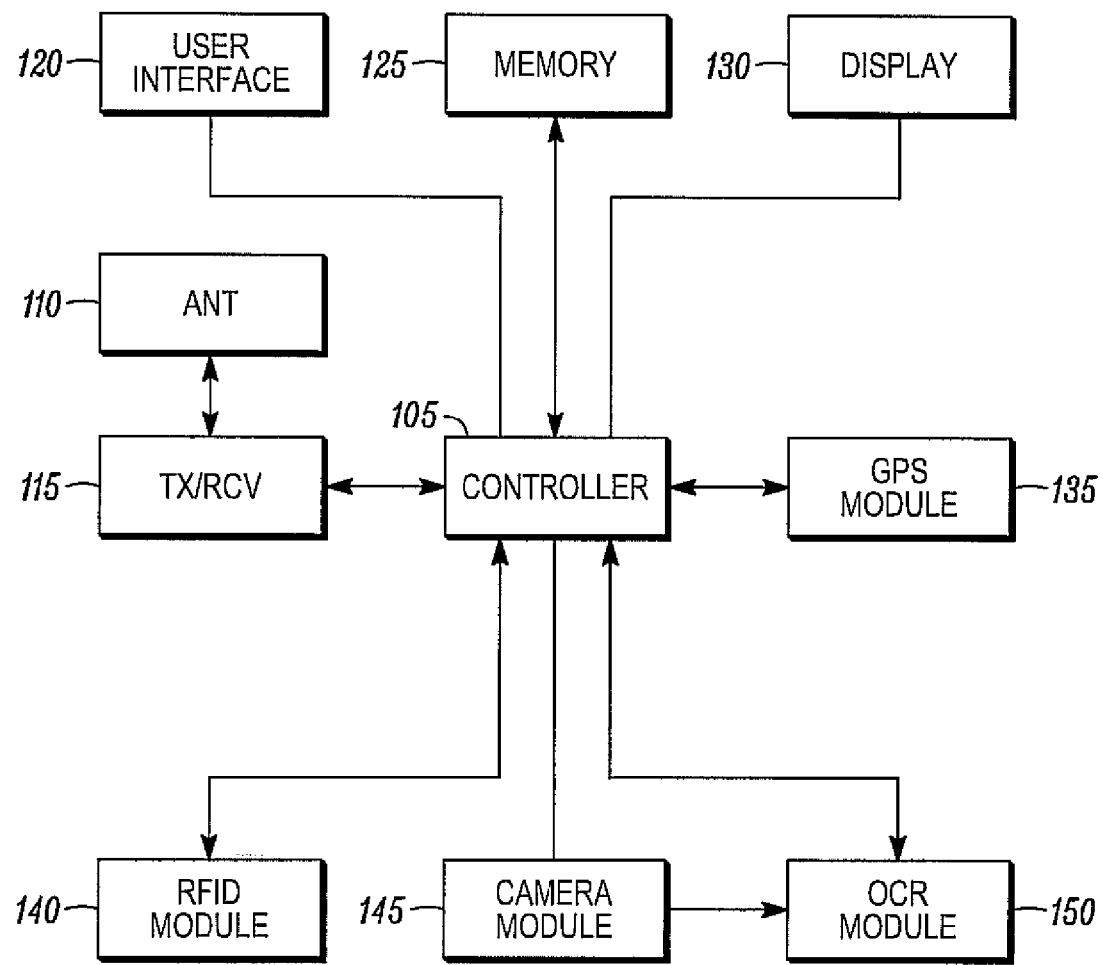
FIG. 1 illustrates a block diagram of an exemplary wireless communication device ("WCD") where an embodiment may be practiced.

FIG. 1 illustrates a block diagram of an exemplary wireless communication device ("WCD") 100 where an embodiment may be practiced. It should be readily apparent to those of ordinary skill in the art that the WCD 100 depicted in FIG. 1 represents a generalized schematic illustration and that other components may be added or existing components may be removed or modified. Moreover, the WCD 100 may be implemented using software components, hardware components, or combinations thereof.

As shown in FIG. 1, the WCD 100 includes a controller 105, an antenna 110 (labeled as "ANT"), a transceiver 115 (labeled as "TX/RCV"), a user interface module 120, a memory 125, a display module 130. In some embodiments, the WCD 100 also includes a global positioning system ("GPS") module 135, a radio frequency identification ("RFID") module 140, a camera module 145, and an optical recognition system ("OCR") module 150.

Although FIG. 1 depicts a WCD as a specific device, it should be readily apparent to those of ordinary skill in the art that the WCD may be any device that can communicate with other devices using wireless communication such as radio frequency, infrared, wireless signals over a network or other similar techniques. In certain embodiments, the WCD may be implemented a mobile telephone, a personal digital assistant ("PDA"), laptop computers and other similar portable computing devices.

Returning to FIG. 1, the controller 105 may be configured to provide the functionality of the WCD 100. More particularly, the controller 105 may execute an operating system and/or software programs that provide the functionality for the WCD 100. The controller 105 may be implemented using a microprocessor, a digital signal processor, application specific integrated circuit or other similar computing platform.

The controller 105 may also be configured to interface with the transceiver 115. The transceiver 115 may be configured to convert data (e.g., voice, video, audio, etc) between a wireless protocol and the native format of the controller 105. The wireless protocol may be implemented using Wireless Personal Area Networks (e.g., Bluetooth, HomeRF, IEEE 802.15.3 protocols or other similar protocols), Wireless Local Area Networks (e.g., Hiperlan 2, IEEE 802.11x, or other similar protocols), WiFi, Cellular Digital Packet Data, Mobitex, Wireless Application Protocol, Global System for Mobiles, or other similar wireless protocol for communicating audio, voice, data and/or video.

The transceiver 115 may be configured to interface with the antenna 110. The antenna 110 may be configured to provide a communication channel between the WCD 100 and a service provider. The service provider may be a cellular telephone provider, a WIFI hotspot, an ad hoc network or other similar network.

The controller 105 may be further configured to interface with the user interface 120. The user interface 120 may be configured to provide a mechanism for a user of the WCD 100 to interact thereof. In some embodiments, the user interface 120 may be Bell keypad or a QWERTY keyboard. In other embodiments, the user interface 120 may be integrated with the display 120. More particularly, the display 120 may be a touch screen where the controller 105 executes software that permits a user to interact with the WCD 100 using a stylus or other similar device.

The controller 105 may be further configured to interface the memory 125. The memory 125 may be configured to store the operating system, application software programs and data entered by the user. The memory 125 may be implemented using persistent memory (e.g., flash memory, EEPROM, etc), non-persistent memory (e.g., RAM) or combinations thereof.

The display 130 may be configured to interface with the controller 105. The display 130 may also be configured to provide a visual interface for the operation of the WCD 100. The display 130 may be implemented using a liquid crystal display matrix or a thin film transistor array.

The controller 105 may be further configured to interface with the GPS module 135. The GPS module 135 may be configured to provide longitude and latitude coordinates for the WCD 100, thus allowing the controller 105 to determine the location for the WCD 100.

The RFID module 140 may be configured to interface with the controller 105. The RFID module 140 may be configured to process RFID data for transmission and/or receiving.

The camera module 145 may be configured to interface with the controller 105. The camera module 145 may provide the functionality of scanning documents for the WCD 100 as well as taking images. For example, the camera module 145 provides a mechanism for the user to scan information from a wallet card through the selection of a menu option displayed on the display module 130. The information may include, for example, addresses, names, barcodes, logos. The controller 105 may forward the scanned information (image data) to or the scanning module 145 may directly forward the image data to the OCR module 150. The OCR module 150 may be configured to convert the image data into a document or text data. Subsequently, the controller 105 may store the converted document/text data in the memory 125.

In certain embodiments, the user may scan in a wallet card using the camera module 145. The scanned image may be converted into text data, which is then stored by the controller 105 in the memory 125. When a user enters an establishment, the WCD 100 may determine the location of the establishment. In some embodiments, the establishment may have a WIFI spot or a wireless network available for access. The WCD 100 may determine from location from the network address broadcasted by the establishment. In other embodiments, the establishment may have a location broadcasting device that broadcasts location messages using Bluetooth and/or RFID protocols. The RFID module 140 may be configured to process the location information from the location messages and forward this information to the controller 105.

In yet other embodiments, the WCD 100 may take the coordinate information from the GPS module 135 and determine if the coordinate information matches any of the address data stored in the memory 125.

If the WCD 100 determines that the address data of a scanned wallet card matches the location of the establishment, the WCD 100 may inform the user that a stored wallet card is relevant by alerting the user. In some embodiments, if the card is a reward card, the wireless communication device may display the status of the reward card, e.g., how many more points to the next reward, on the display 130. In other embodiments, the WCD 100 may display a gift card for the location. In yet other embodiments, the WCD 100 may be used in transactions at a location. More specifically, the WCD 100 may display the membership number for a membership club or transmit the appropriate code for a gift card to the cash register.

Figure 2:
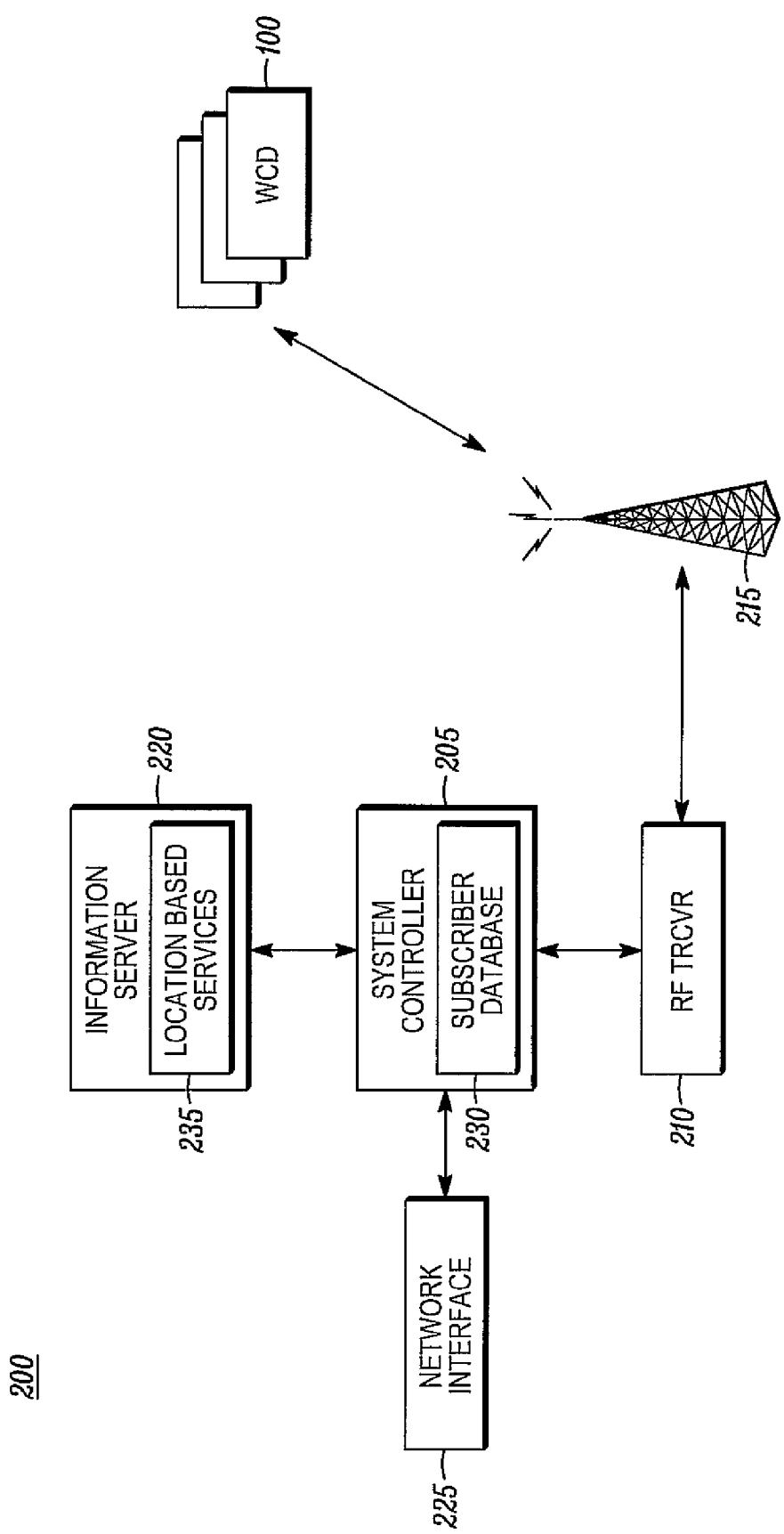
FIG. 2 illustrates a block diagram of an exemplary system where another embodiment may be practiced.

FIG. 2 illustrates a block diagram of an exemplary system 200 where another embodiment may be practiced. It should be readily apparent to those of ordinary skill in the art that the system 200 depicted in FIG. 2 represents a generalized schematic illustration and that other components may be added or existing components may be removed or modified. Moreover, the system 200 may be implemented using software components, hardware components, or combinations thereof.

As shown in FIG. 2, the system 200 includes a system controller 205, a RF transceiver 210 ("labeled RF TRCVR"), antennas 215, an information server 220, and a network interface 225. The system controller 205 may be configured to interface with the RF transceiver 210 to communicate with the WCD 100. The system controller 205 may function utilizing any wireless RF channel, for example, a one- or two-way pager channel, a mobile cellular channel, or a mobile radio channel.

The system controller 205 may include a subscriber database 230. The subscriber database provides information related to the WCD 100 as the WCD 100 enters the cell site of the antenna 215. The system controller 205 may also be configured to interface with a network interface 225. The network interface 225 may be configured to provide a communication channel to the public switch telephone network.

The system controller 205 may be further configured to interface with an information server 220. The information server 220 may be configured to provide content and/or services for the WCD 100. For example, the WCD may be an Internet capable device. As such, the information server 220 may be the information portal to the Internet for the WCD 100.

The information server 220 may include a location based services ("LBS") module 230. The LBS module 230 may be configured to provide location information and services for the WCD 100. For example, the LBS module 230 may receive a message packet with the GPS coordinates of the WCD 100. The LBS module 230 may be configured to return a street address to the WCD 100. As another example, the LBS module 230 may receive a message packet with a street address and may return the GPS coordinates of the street address to the WCD 100. These services are typically provided by Mapquest™ and/or MapPoint™.

Figure 3:
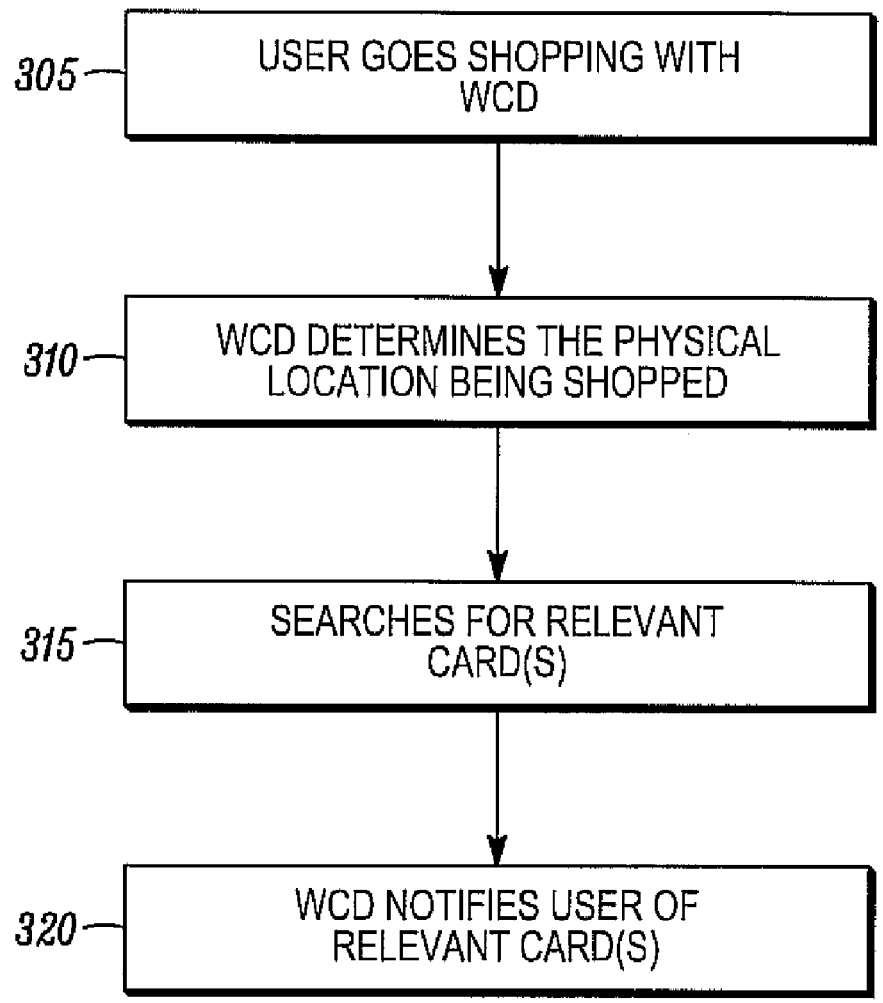
FIG. 3 illustrates a flow diagram implemented by yet another embodiment.

FIG. 3 illustrates a flow diagram 300 implemented by yet another embodiment. It should be readily apparent to those of ordinary skill in the art that the flow diagram 300 depicted in FIG. 3 represents a generalized schematic illustration and that other steps may be added or existing steps may be removed or modified.

As shown in FIG. 3, a user equipped with a WCD 100 may go shopping, in step 305. As the user enters an establishment, the WCD 100 may determine the location of the establishment, in step 310. The establishment may be retail store (e.g., clothing, a national coffee chain, grocery store, etc.), a club (e.g., health, membership store, etc.) or other similar type of store. From the location data, the WCD 100 may search the stored scanned wallet card, in step 315. More particularly, the user previously inputted (by scanning, manual entry, or RFID entry) the wallet cards that the user typically carries. In step 320, the WCD 100 may notify the user by sound, visually, vibration, or other means that a relevant card has been located. In some embodiments, the WCD 100 may display the information (e.g., membership number, account number, account balance, etc.) for the user to review and use during transactions. The information may also be presented to the customer audibly for instance over a Bluetooth headset.

Figure 4:
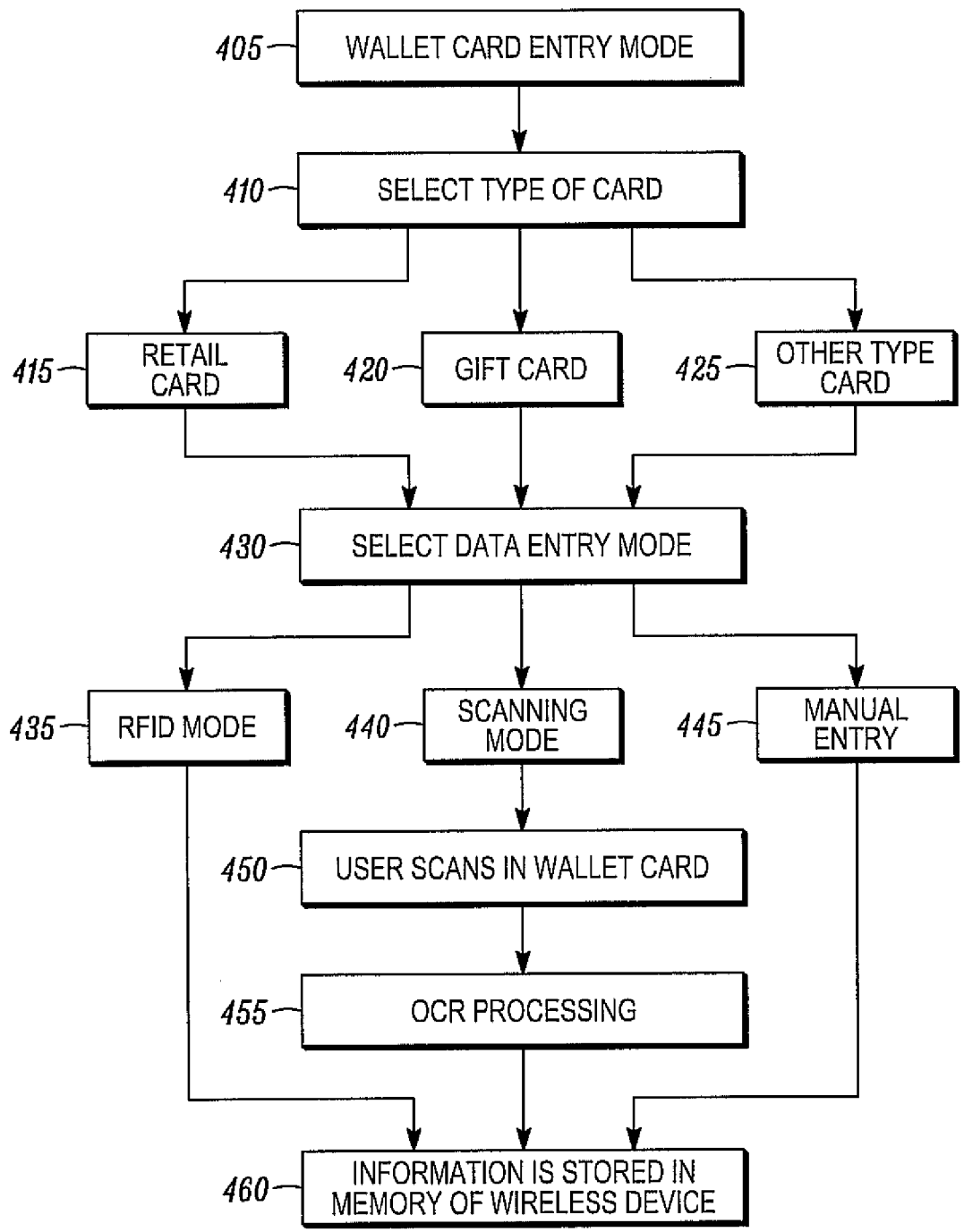
FIG. 4 illustrates a flow diagram implemented by yet another embodiment.

FIG. 4 illustrates a flow diagram 400 implemented by yet another embodiment. It should be readily apparent to those of ordinary skill in the art that the flow diagram 400 depicted in FIG. 4 represents a generalized schematic illustration and that other steps may be added or existing steps may be removed or modified.

As shown in FIG. 4, a user may enter a mode in the WCD 100 that allows entry of data from wallet card, in step 405. For example, the user may scroll to a menu option that permits data entry of a wallet card.

In step 410, the user may be displayed a menu display that shows a menu selections. In one embodiment, the selection could be a retail card selection 415, a gift card selection 420, and other type of card selection 425. The retail card selection 415 may be used to enter information related to cards issued by establishments such as grocery stores, retail stores, restaurants, health clubs, and other similar types. The information would include at least the name of the establishment, physical address, and the identifying number for the wallet card. The gift card selection 420 may be used to enter information related to gift cards. The information could include the account number, account balance, issuing establishment, and physical address. The other type of card selection 425 may be used to enter information related to wallet cards issued by insurance companies, libraries, and other similar lines of businesses.

In step 430, the user may be displayed another menu to select the data entry for a selected wallet card. The selected menu may then provide three options in entering the information an RFID mode, a scanning mode, and a manual entry mode.

If the user selects the RFID mode, in step 435, the WCD 100 may be configured to process the information regarding the wallet card through the RFID module 140. More particularly, if the wallet card has an RFID chip, the information transmitted by the RFID chip may be processed by the RFID module 140. After the RFID signal is processed, the information related to the wallet card is then forwarded to memory 125 for storage, in step 460.

If the user selects the scanning mode in step 440, the WCD 100 may invoke the camera module 145 to scan the selected wallet card, in step 450. In one embodiment, an infrared port (not shown) may be utilized to scan the wallet card. In another embodiment, the camera module 145 of the WCD 100 may be used to take a photograph of the wallet card.

In step 455, the image file of the wallet card generated by the scanning module 140 may then be forwarded to the OCR module 150 for processing. The OCR module 150 may then be configured to convert the image file into a text file. The text information may then be stored in the memory 125, in step 460. Barcodes may be optically identified, read, and the information stored in memory 125, including the barcode protocol.

If the user selects the manual entry in step 445, the user may utilize the user interface module 120 to enter the information from the wallet card. In one embodiment using a Bell keypad, the user would use the keypad to manually enter the information. In other embodiments using a touch screen with handwriting recognition, the user may enter the information through the touch screen. It should be readily obvious that various methods of data entry are contemplated by embodiments of the invention.

In step 460, the information entered by the user may be then stored in the memory 125 of the WCD 100.

Figure 5:
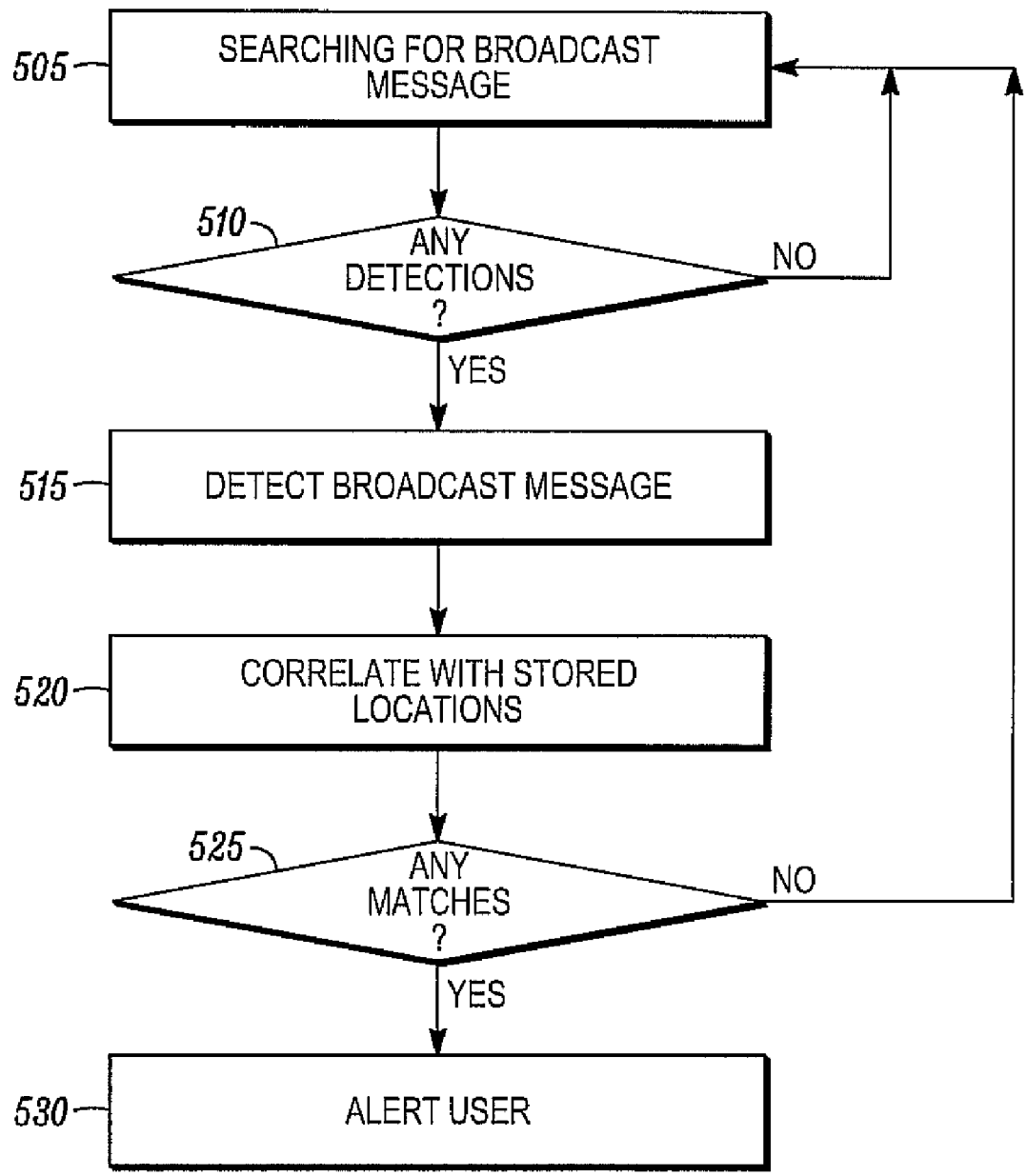
FIG. 5 illustrates a flow diagram implemented by yet another embodiment.

FIG. 5 illustrates a flow diagram 500 implemented by yet another embodiment. It should be readily apparent to those of ordinary skill in the art that the flow diagram 500 depicted in FIG. 5 represents a generalized schematic illustration and that other steps may be added or existing steps may be removed or modified.

As shown in FIG. 5, the WCD 100 may be configured to detect a location broadcast message from an establishment, in step 505. More particularly, some establishments have WIFI hotspots or access to wireless networks. In other establishments, a Bluetooth device may broadcast location messages as customers/clients enter the establishment. Accordingly, the WCD 100 may be configured to search for these types of messages.

In step 510, if the WCD 100 does not detect any location broadcast messages, the WCD returns to the processing of step 505. Otherwise, if the WCD 100 detects a location broadcast message, the WCD 100 may be configured to determine the location from the location broadcast message, in step 515. More particularly, if the location broadcast message is from a WIFI hotspot or wireless network, the WCD 100 may be configured to translate the network address into a physical address for the establishment. If the location broadcast message is from a Bluetooth device, the message may contain the physical address.

In step 520, the WCD 100 may then be configured to search memory 125 for any matching locations from the stored wallet cards. If the WCD 100 determines (step 525) that none of the locations stored in memory 125 matches the current location, the WCD 100 may proceed to the processing of step 505.

Otherwise, if the WCD 100 determines that one of the locations in memory matches the current location, the WCD 100 may be configured to alert the user, in step 530. In one embodiment, the WCD 100 may trigger an audio alert and display the information from the matching wallet card on the display 130. This information may include the bar code information, account balance, account information, etc.

It is also conceived that the Detected broadcast message in step 515 could be searched using the internet to determine if the location corresponds to a store. The store name retrieved can then be correlated with stored store names in step 520.

Figure 6:
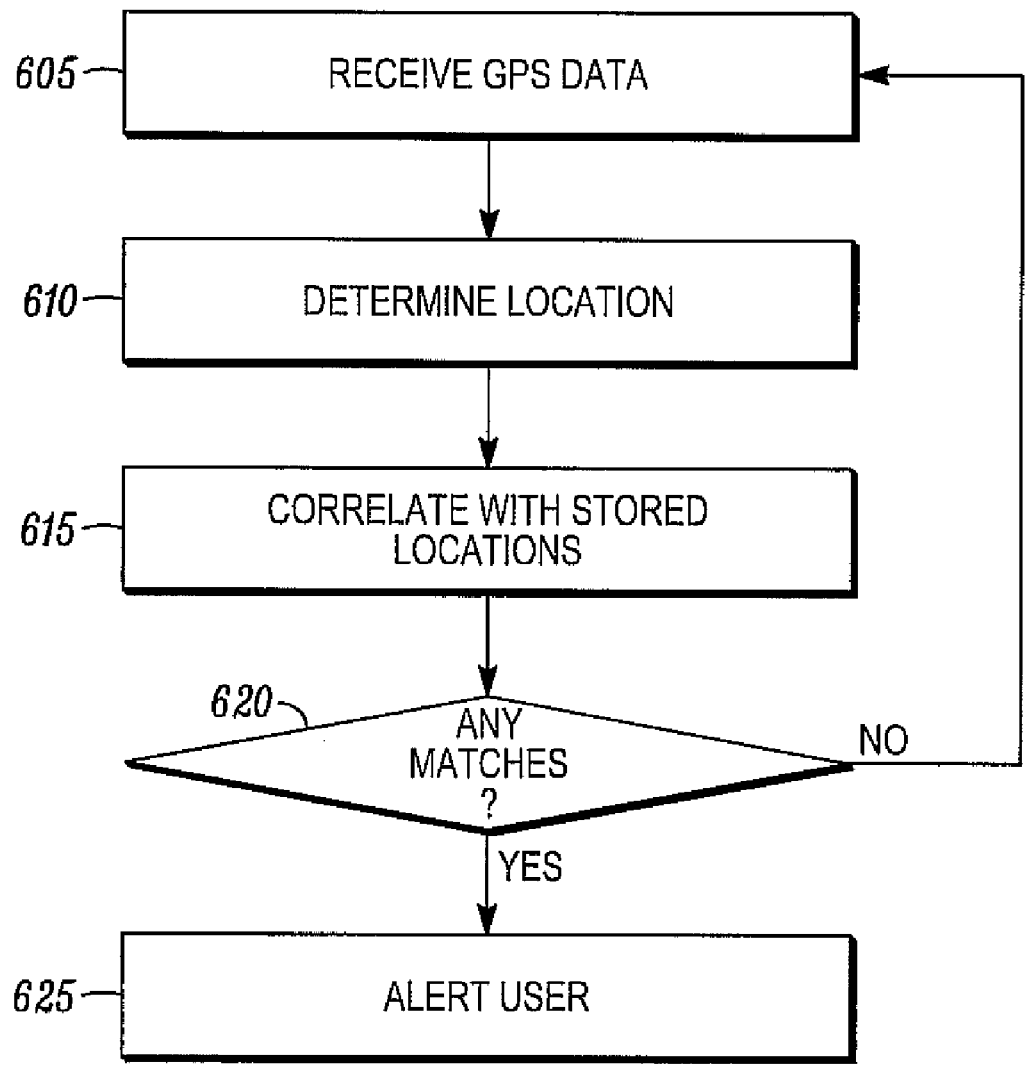
FIG. 6 illustrates a flow diagram implemented by yet another embodiment.

FIG. 6 illustrates a flow diagram 600 implemented by yet another embodiment. It should be readily apparent to those of ordinary skill in the art that the flow diagram 600 depicted in FIG. 6 represents a generalized schematic illustration and that other steps may be added or existing steps may be removed or modified.

As shown in FIG. 6, the WCD 100 may be configured to determine the location of an establishment using GPS data. More particularly, the WCD 100 may receive GPS data from the GPS module 135, in step 605. As a non-limiting example, many cellular telephones typically include a GPS module for emergency personnel to locate the user.

In step 610, the WCD 100 may be configured to determine the location from the GPS data. More particularly, the WCD 100 may extract the longitude and latitude coordinates from the GPS data. In one embodiment, the WCD 100 may use the coordinate information to search the memory 125 for matching locations. For this embodiment, the memory 125 may store the address information of the wallet cards in latitude/longitude format. In other embodiments, the WCD 100 may forward the received coordinate information to the LBS module 235 (See FIG. 2) to return a physical address. The WCD 100 may then use the physical address to search memory 125. It should be readily apparent to those of ordinary skill in the art that other techniques or combinations of existing techniques may be used to determine the physical location.

In step 615, the WCD 100 may then be configured to search memory 125 for any matching locations from the stored wallet cards. If the WCD 100 determines that none of the locations stored in memory 125 matches the current location, the WCD 100 may proceed to the processing of step 605.

Otherwise, if the WCD 100 determines that one of the locations in memory matches the current location, the WCD 100 may be configured to alert the user, in step 625. In one embodiment, the WCD 100 may trigger an audio alert and display the information from the matching wallet card on the display 130. This information may include the bar code information, account balance, account information, etc.

Figure 7:
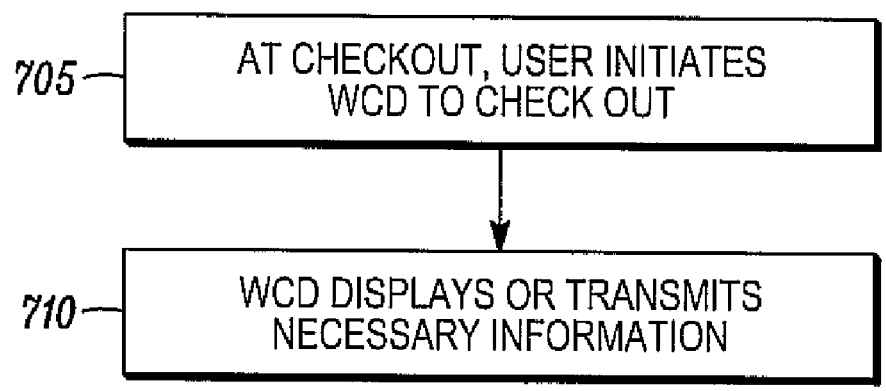
FIG. 7 illustrates a flow diagram implemented by yet another embodiment.

FIG. 7 illustrates a flow diagram 700 implemented by yet another embodiment. It should be readily apparent to those of ordinary skill in the art that the flow diagram 700 depicted in FIG. 7 represents a generalized schematic illustration and that other steps may be added or existing steps may be removed or modified.

As shown in FIG. 7, the user may use the displayed information related to the relevant wallet card at checkout, in step 705. More particularly, while entering the establishment, the processing related to FIGS. 5-6 has determined that a relevant card has been found. The relevant card may be a grocery card, a membership card, a gift card (with account and account balance information) being available for the user to use.

In step 710, the user may use the information related to the selected wallet card during checkout. More particularly, the display module 130 may display a bar code of the selected wallet card for the checkout device to scan. In other embodiments, the RFID module 140 may broadcast the information (account number, account balance, etc.) to the checkout device. In yet other embodiments, a combination of these methods may be utilized to transfer the information to the checkout device.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of managing information, the method comprising:
    storing information associated with at least one wallet card in a mobile telephone;
    entering an establishment with the mobile telephone;
    determining a location of the establishment;
    determining whether at least one wallet card is associated with the location; and
    automatically outputting, on the mobile telephone, information from the at least one wallet card in response to the determination that the location is associated with the at least one wallet card.

2. The method according to claim 1, further comprising:
    determining a category of at least one wallet card; and
    displaying a status of at least one wallet card in response to the category being a rewards card.

3. The method according to claim 2, further comprising:
    purchasing an item related to the at least one wallet card; and
    receiving status information related to the item in response to the purchase of the item.

4. The method according to claim 3, further comprising storing the status information in the electronic device.

5. The method according to claim 1, wherein automatically outputting information further comprises:
    determining a category of the at least one wallet card; and
    automatically outputting, on the mobile telephone, information from the at least one wallet card in response to the category being a gift card and the determination that the location is associated with the at least one wallet card.

6. The method according to claim 5, further comprising transmitting account balance of the at least one wallet card for a purchase of an item.

7. The method according to claim 6, further comprising:
    receiving status information related to the purchase of the item; and
    storing the status information in the mobile telephone.

8. The method according to claim 1, wherein the information is entered by scanning the at least one wallet card.

9. The method according to claim 1, wherein the information is entered by scanning the at least one wallet card by a camera on the mobile telephone.

10. The method according to claim 9, wherein the at least one wallet card is a loyalty card.

11. The method according to claim 9, wherein the at least one wallet card is a gift card.

12. A method of managing information, the method comprising:
    storing information associated with at least one wallet card in a wireless telephone;
    receiving at least one message from an establishment;
    determining whether at least one wallet card is associated with the establishment; and
    automatically outputting, on the wireless telephone, information from the at least one wallet card in response to the determination that the establishment is associated with the at least one wallet card.

13. The method according to claim 12, further comprising:
    determining a category of at least one wallet card; and
    displaying a status of at least one wallet card in response to the category being a loyalty card.

14. The method according to claim 13, further comprising:
    purchasing an item related to the at least one wallet card; and
    receiving status information related to the item in response to the purchase of the item.

15. The method according to claim 12, wherein automatically outputting information further comprises:
    determining a category of the at least one wallet card; and
    automatically outputting, on the wireless telephone, information from the at least one wallet card in response to the category being a gift card and the determination that the establishment is associated with the at least one wallet card.

16. The method according to claim 15, further comprising transmitting account balance of the at least one wallet card for a purchase of an item.

17. An apparatus for managing information, the apparatus comprising:
    a wireless telephone further comprising:
        a controller
        a location determination module configured to interface with the controller;
        a memory configured to interface with the controller; and
        a scanner module configured to interface with the controller, wherein the controller is configured to store information related to a wallet card being scanned by the scanner module in the memory, determining a location of an establishment with the location determination module, and automatically outputting, on the wireless telephone, information related to the wallet card in response to the determination of the location of the establishment.

18. The apparatus according to claim 17, wherein the controller is further configured to determine the location of the establishment based on a message received from the establishment.

19. The apparatus according to claim 18, further comprises a transmitter configured to interface with the controller, wherein the controller is further configured to transmit the information related to the wallet card through the transmitter.

20. The apparatus according to claim 17, further comprises a display module configured to interface with the controller, wherein the controller is further configured to display information related to the wallet card on the display module.

21. The apparatus of claim 17, wherein the information outputted is an alert when the user enters a predefined distance from an establishment associated with the wallet card.

* * * * *